United States Patent [19]

Reinartz et al.

[11] Patent Number: 4,578,194

[45] Date of Patent: Mar. 25, 1986

[54] PROCESS FOR REMOVING POLYCHLORINATED BIPHENYLS FROM TRANSFORMER-INSULATING LIQUIDS

[75] Inventors: Dieter Reinartz, St. Augustin; Heinrich Bender, Troisdorf; Günter Laurent, Bad Honnef, all of Fed. Rep. of Germany

[73] Assignee: Didier-Werke AG, Wiesbaden, Fed. Rep. of Germany

[21] Appl. No.: 692,624

[22] Filed: Jan. 18, 1985

[30] Foreign Application Priority Data

Jan. 20, 1984 [DE] Fed. Rep. of Germany ....... 3401866

[51] Int. Cl.[4] .............................................. B01D 15/00

[52] U.S. Cl. .................................... 210/673; 210/674; 210/677; 210/690; 210/909

[58] Field of Search ............... 210/671, 673, 674, 675, 210/676, 677, 690, 909

[56] References Cited

U.S. PATENT DOCUMENTS

| | | | |
|---|---|---|---|
| 4,042,498 | 8/1977 | Kennedy | 210/674 |
| 4,197,195 | 4/1980 | Ochsenfeld et al. | 210/677 |
| 4,303,531 | 12/1981 | Kawabata et al. | 210/674 |
| 4,477,354 | 10/1984 | Fessler | 210/909 |
| 4,526,677 | 7/1985 | Grantham et al. | 210/909 |

*Primary Examiner*—Ivars Cintins

*Attorney, Agent, or Firm*—Wenderoth, Lind & Ponack

[57] ABSTRACT

Process for the long-duration removal of polychlorinated biphenyls (PCB) from transformer-insulating liquids when substituting insulating liquids, particularly silicon oils, for PCB oils. The PCB contaminants can be removed continuously or substantially continuously from the transformer-insulating liquids using an adsorption resin, thus preventing PCB from accumulating in the transformer-insulating liquid. The insulating liquid is passed substantially continuously through the adsorption resin; adsorption resin, after enrichment with PCB oil, is washed with a solvent for PCB oils; and the washed resin is freed from residual solvent by rinsing it with a gas prior to reusing the thus regenerated resin to adsorb additional PCB oil.

17 Claims, No Drawings

PROCESS FOR REMOVING POLYCHLORINATED BIPHENYLS FROM TRANSFORMER-INSULATING LIQUIDS

BACKGROUND OF THE INVENTION

The present invention relates to a process for removing polychlorinated biphenyls (hereinafter referred to as "PCB") from transformer-insulating liquids. The invention has special significance in removing residual PCB from transformer-insulating liquids, particularly silicon oils, which have been substituted for PCB oils previously used as a transformer-insulating liquid.

A principal field of application for PCB is their application as insulating liquids or coolants. PCB is a so-called askarel, meaning they are electrically insulating, flame-resistant liquids that generate neither combustible nor explosive gases in electric arcs. These askarels find wide application as transformer-insulating liquids.

To protect the environment, and for reasons of safety, it has proved necessary to adapt PCB-cooled transformers to insulating liquids or coolants that are ecologically less hazardous, particularly silicon oils. However, it has become apparent that it is by no means easy to substitute other transformer-insulating liquids, for example silicon oils, for PCB oils, because it is practically impossible to remove PCB oil from a transformer without leaving residual PCB, even when the transformer, after transport, is disassembled and thoroughly cleaned at an appropriate transfer facility. Over time, the residual quantities of PCB oil that inevitably remain in the transformers and/or their components enter the new transformer-insulating liquid so that, after some time, contents of up to 10% by volume of PCB oil are present in the replacement transformer-insulating liquid.

It is common practice to remove these PCB contaminants from the replacement transformer-insulating liquid by adsorption or chemical conversion in special filters. However, substantially complete removal of PCB by such known methods takes a long period of time to achieve.

SUMMARY OF THE INVENTION

The main object of the present invention is to provide a process for the substantially complete removal of PCB from transformer-insulating liquids, especially silicon oils, which in particular can be carried out even during the operation of a transformer.

It has been found that the use of a relatively small quantity of adsorption resin for PCB oil permits a continuous or substantially continuous removal, over a long duration, of polychlorinated biphenyls from transformer-insulating liquids.

DETAILED DESCRIPTION OF THE INVENTION

More particularly, the present invention provides a process for removing polychlorinated biphenyls from a transformer-insulating liquid containing the polychlorinated biphenyls, which comprises substantially continuously circulating the liquid through a circuit comprising an adsorption resin which is capable of adsorbing the polychlorinated biphenyls, to adsorb the polychlorinated biphenyls on the resin; washing the resin having the polychlorinated biphenyls adsorbed thereon with a solvent for the polychlorinated biphenyls to dissolve the polychlorinated biphenyls in the solvent and thus remove the polychlorinated biphenyls from the resin; and passing a gas through the solvent-treated resin to entrain residual solvent in the gas and thus remove the residual solvent from the resin, thereby regenerating the resin.

In the specification and claims, the term "transformer-insulating liquids" by itself means any transformer-insulating liquid that does not contain, or is not composed of, PCB.

The process of this invention makes it possible to remove PCB oils continuously or substantially continuously from the transformer-insulating liquid containing such oils, so as to avoid the disadvantage inherent in the prior art processes. Namely, in the prior art processes, PCB oils can only be removed from the transformer-insulating liquid after relatively long periods of time, for example a year or more, i.e. when all residual PCB oils, remaining in the transformer after replacing the PCB oils with another transformer-insulating liquid, are present in dissolved form in the replacement transformer-insulating liquid. In the prior art processes, after such a long period of time, the concentration of PCB oils can be several volume %, even up to 10% by volume of the transformer-insulating liquid, so that during this period there is exposure to danger, for example, in case of fire or in the event that the transformer-insulating liquid escapes from the transformer. The present invention, on the other hand, eliminates this danger.

The process of the invention is characterized in that the insulating liquid is passed substantially continuously (including continuously) through an adsorption resin for PCB oil; the adsorption resin, after enrichment with PCB oil, is freed therefrom by washing with a solvent for the PCB oil; and the adsorption resin, which has been washed with solvent, is freed from the solvent by rinsing with a gas prior to being reused for the adsorption of additional PCB oil.

The transformer-insulating liquid is passed substantially continuously through the adsorption resin. This can be done by causing the transformer-insulating liquid to move through a column filled with the adsorption resin by means of a bypass, and via a suitable pump. Based on preliminary tests and empirical values, it is easy to determine the time it takes for the adsorption resin to become loaded with PCB oil. After the loading of the adsorption resin with PCB oil, the bypass can be closed and the adsorption resin, by washing with a solvent, can be freed from the PCB oil adsorbed thereon.

If desired, to reduce the quantity of transformer-insulating liquid adhering to the absorption resin in the column, a gas, preferably an inert gas, can be passed through the column to remove most of the transformer-insulating liquid from the resin. The inert gas is one which is inert to the resin, transformer-insulating liquid, PCB and solvent, for example, nitrogen, helium and argon. The resin is then washed with solvent to remove the PCB, and a gas, preferably an inert gas, is then passed through the column to dry the resin, at room temperature or an elevated temperature, thus regenerating the resin, after which the regenerated resin can be reused for adsorption of additional PCB.

The solvent, contaminated with PCB oil, is reprocessed in an appropriate facility. For example, it can be separated from the PCB oil by distillation, during which the PCB oil is obtained in concentrated form, so that it is much easier to reprocess or to discard this PCB oil in accordance with the prevailing rules and regulations.

The thus regenerated solvent can be recycled for use in washing the resin.

If the adsorption resin is contained in a column mounted on the outer surface of the transformer, regeneration of the resin can be effected with ease.

According to a preferred embodiment of the invention, the adsorption resin is contained in cartridges mounted on the transformer. After closure of the by-pass, and by use of suitable coupling means, the cartridges can easily be exchanged on the site where the transformer is located. The replaced adsorption resin cartridges, i.e. cartridges loaded with PCB oil, can then be reprocessed in a suitable regeneration facility in the manner described above. In this case, regeneration of the resin can be effected either in the cartridges, or the cartridges can be so designed that the adsorption resin can easily be removed therefrom and then regenerated in another suitable separate device.

Alternatively, the transformer-insulating liquid that has been contaminated with PCB can be totally replaced on the site by transformer-insulating liquid that is free of PCB, and the contaminated liquid can be collected and subsequently reprocessed at a central point.

Any suitable solvent for PCB oil can be used to regenerate the adsorption resin, as long as it dissolves PCB without interfering with the function of the resin. Acetone is a particularly preferred solvent.

Following elution of the PCB oil from the adsorption resin with a suitable solvent, the resin must be dried out to remove residual solvent on the resin prior to reusing the adsorption resin for the adsorption of additional PCB oil. This drying process can be effected with any suitable gas. Advantageously, an inert gas as described above is utilized, which is preferably passed through the adsorption resin at an elevated temperature, i.e. above room temperature, for example 60°–95° C., in order to achieve faster drying, i.e. removal of the residual solvent.

In order to prevent loss of solvent, the gas is preferably recycled, the solvent vapors being continuously removed from the recirculated gas. This can be achieved by condensation of the solvent vapors in one or more cold traps. In this way, practically the entire quantity of solvent can be recovered.

If desired, in order to remove the solvent from the gaseous phase without any residue, a gas phase adsorber, for example an activated charcoal filter, can be connected in series with the cold trap.

Any adsorption resin can be used in the present invention, as long as it will adsorb PCB, and desorb PCB when eluted with the solvent. Preferably, the resin is a polymeric adsorption resin which is insoluble in the solvent, for example an Amberlite resin. Especially preferred are the insoluble cross-linked polystyrene resins, for example Amberlite XAD-4.

The application of activated charcoal as adsorption agent for the removal of PCB oil from transformer-insulating liquids has proved detrimental, because increasingly smaller portions of the activated charcoal enter the liquids being passed through the charcoal, so that the conductivity of the insulating liquid is increased. This has a deleterious effect in the case of transformer-insulating liquids.

The invention will now be described in greater detail with reference to the following example, which is not intended to limit the invention.

EXAMPLES (1) Trial in a Column

A polymeric resin (Amberlite XAD-4) was used as the adsorption resin. As the contaminated transformer-insulating liquid, silicon oil contaminated with 3,000 ppm (parts per million) PCB was used, as the insulating liquid to be cleaned.

One liter of this contaminated insulating liquid was passed through 100 ml of the polymeric resin. The PCB concentration in the emerging insulating liquid was 1,500 ppm.

The polymeric resin was regenerated at room temperature with three Bett volumes, i.e. 300 ml, of acetone.

The resin treated with acetone was dried by passing nitrogen therethrough at a temperature of 80° C. The quantity of nitrogen used for the drying was 20 liters/-hour, and the drying time was 1.5 hours.

Then, this one liter of pretreated insulating liquid containing 1,500 ppm PCB was again pumped through 100 ml of the regenerated resin. The PCB concentration in the emerging oil was below 50 ppm.

(2) Trials in a Stirring Process 2.1 Adsorption Resin specific surface: 750 g/m$^2$ porosity: 5 Vol % basis: polystyrene 100 ml silicon oil contaminated with 6000 ppm PCB+5 g adsorption resin were stirred for 24 hours.

Residual PCB-concentration in silicon oil: 1100 ppm.

Regeneration of the adsorption resin with 50 ml acetone.

The adsorption resin was subsequently dried and used again for removing PCB.

2.2 100 ml silicon oil contaminated with 2000 ppm PCB+5 g regenerated adsorption resin of trial 2.1 were stirred for 24 hours.

Residual PCB-concentration in silicon oil: 200 ppm.

Regeneration of the adsorption resin with methyl ethyl ketone.

The adsorption resin was subsequently dried and again applied for removing PCB.

2.3 100 ml silicon oil contaminated with 110 ppm PCB+5 g regenerated adsorption resin of trial 2.2 were stirred for 24 hours.

Residual PCB-concentration in silicon oil: 3 ppm.

(3) Trials in a Stirring Process 3.1 Adsorption Resin specific surface: 330 g/m$^2$ porosity: 42 Vol % basis: polystyrene 100 ml silicon oil contaminated with 6000 ppm PCB+5 g adsorption resin were stirred for 24 hours.

Residual PCB concentration: 2080 ppm.

3.2 Adsorption Resin specific surface: 650 g/m$^2$ basis: polystyrene 100 ml silicon oil contaminated with 6000 ppm PCB+5 g adorption resin were stirred for 24 hours.

Residual PCB concentration: 2420 ppm.

We claim:

1. A process for removing polychlorinated biphenyls from a transformer-insulating liquid containing said polychlorinated biphenyls, which comprises:

substantially continuously circulating said liquid through a circuit comprising an adsorption resin which is capable of adsorbing said polychlorinated biphenyls, to adsorb said polychlorinated biphenyls on said resin;

washing said resin having said polychlorinated biphenyls adsorbed thereon with a solvent for said polychlorinated biphenyls to dissolve said polychlorinated biphenyls in said solvent and thus remove said polychlorinated biphenyls from said resin; and passing a gas through the solvent-treated resin to entrain residual solvent in said gas and thus remove said residual solvent from said resin, thereby regenerating said resin.

2. A process according to claim 1, wherein said transformer-insulating liquid is substantially continuously circulated through a circuit comprising a transformer and said adsorption resin.

3. A process according to claim 1, wherein said adsorption resin is contained in an exchangeable cartridge removable from said circuit, and said washing and passing steps to regenerate said resin are conducted in a regenerating facility.

4. A process according to claim 1, which further comprises using the regenerated resin to adsorb said polychlorinated biphenyls from said transformer-insulating liquid.

5. A process according to claim 1, wherein said gas is passed through said solvent-treated resin at an elevated temperature.

6. A process according to claim 5, wherein said elevated temperature is within the range of 60°–95° C.

7. A process according to claim 1, which further comprises condensing the residual solvent from said gas, and recycling the resultant regenerated gas for use in removing residual solvent from said solvent-treated resin.

8. A process according to claim 7, wherein said condensing is effected by condensing means comprising at least one cold trap.

9. A process according to claim 8, wherein said condensing means further comprises a gas-phase adsorber connected in series with said cold trap.

10. A process according to claim 1, which further comprises distilling said solvent containing said polychlorinated biphenyls dissolved therein to regenerate said solvent, and recycling the regenerated solvent for use in washing said resin.

11. A process according to claim 1, wherein said gas is an inert gas.

12. A process according to claim 11, wherein said inert gas is nitrogen.

13. A process according to claim 1, wherein said adsorption resin is a polymeric adsorption resin which is insoluble in said solvent.

14. A process according to claim 13, wherein said adsorption resin is an insoluble cross-linked polystyrene resin.

15. A process according to claim 1, wherein said transformer-insulating liquid is a silicon oil.

16. A process according to claim 1, wherein said solvent is acetone.

17. A process according to claim 1, wherein said solvent is methylethylketone.

* * * * *